(12) United States Patent
Ishiguro

(10) Patent No.: US 6,356,714 B1
(45) Date of Patent: Mar. 12, 2002

(54) ELECTRONIC FLASH LIGHT-EMISSION CONTROLLING METHOD AND APPARATUS AND CAMERA

(75) Inventor: Minoru Ishiguro, Omiya (JP)

(73) Assignee: Fuji Photo Optical Co., Ltd, Saitama (JP)

(*) Notice: Subject to any disclaimer, the term of this patent is extended or adjusted under 35 U.S.C. 154(b) by 0 days.

(21) Appl. No.: 09/594,798

(22) Filed: Jun. 16, 2000

(30) Foreign Application Priority Data

Jun. 18, 1999 (JP) .......................................... 11-172603

(51) Int. Cl.[7] .............................. G03B 9/70; G03B 7/00
(52) U.S. Cl. ....................................... 396/166; 396/226
(58) Field of Search .................................. 396/155, 166, 396/167, 168, 213, 220, 226, 485, 483

(56) References Cited

U.S. PATENT DOCUMENTS 5,159,364 A    10/1992  Yanagisawa et al. ......... 396/76
5,606,391 A  * 2/1997  Aoki et al. ..................... 396/48
5,999,752 A  * 12/1999 Ueyama et al. ............. 396/213
6,029,015 A    2/2000  Ishiguro ........................ 396/187

FOREIGN PATENT DOCUMENTS

JP          09211524 A        8/1997

* cited by examiner

Primary Examiner—David M. Gray
Assistant Examiner—Rochelle Blackman (57) ABSTRACT

A cartridge information reading part determines whether a film loaded in a camera is a negative film or a positive film. If the film is the negative film whose latitude is large, then an electronic flash is used even when an appropriate exposure can be obtained without the light of the electronic flash. The exposure by the electronic flash is added to an exposure by the external light, and the shooting is performed with a high exposure. Meanwhile, if the film is the positive film whose latitude is small, then the exposure by the electronic flash added to the exposure by the external light is reduced, or the light-emission of the electronic flash is prohibited, and thus a photograph of a good quality can be taken.

13 Claims, 14 Drawing Sheets

| (BV) | | | | | DISTANCE(m) |
|---|---|---|---|---|---|
| B4 | OFS = $\frac{1}{8}$ (FL=-3EV) | OFS = $\frac{1}{4}$ (FL=-2EV) | OFS = $\frac{1}{2}$ (FL=-1EV) | ELECTRONIC FLASH OFF (OFF) | |
| B3 | OFS = $\frac{1}{4}$ (FL=-2EV) | OFS = $\frac{1}{4}$ (FL=-2EV) | OFS = $\frac{1}{2}$ (FL=-1EV) | ELECTRONIC FLASH OFF (OFF) | |
| B2 | OFS = $\frac{1}{2}$ (FL=-1EV) | OFS = $\frac{1}{2}$ (FL=-1EV) | OFS = 1 (FL=0EV) | OFS = 1 (FL=0EV) | |
| B1 | OFS = $\frac{3}{4}$ (FL=-0.42EV) | OFS = $\frac{3}{4}$ (FL=-0.42EV) | OFS = 1 (FL=0EV) | OFS = 1 (FL=0EV) | |
| | OFS = 1 (FL=0EV) | OFS = 1 (FL=0EV) | OFS = 1 (FL=0EV) | OFS = 1 (FL=0EV) | |
| | 0.35 | D1 1.3 | D2 3.0 | D3 8.9 | ∞ |

| (BV) | | | | |
|---|---|---|---|---|
| B4 | OFS = 1/8 (FL=-3EV) | OFS = 1/4 (FL=-2EV) | OFS = 1/2 (FL=-1EV) | ELECTRONIC FLASH OFF (OFF) |
| B3 | OFS = 1/8 (FL=-3EV) | OFS = 1/4 (FL=-2EV) | OFS = 1/2 (FL=-1EV) | ELECTRONIC FLASH OFF (OFF) |
| B2 | OFS = 1/8 (FL=-3EV) | OFS = 1/4 (FL=-2EV) | OFS = 1/2 (FL=-1EV) | OFS = 1 (FL=0EV) |
| B2 | OFS = 3/4 (FL=-0.42EV) | OFS = 3/4 (FL=-0.42EV) | OFS = 1 (FL=0EV) | OFS = 1 (FL=0EV) |
| B1 | OFS = 1 (FL=0EV) | OFS = 1 (FL=0EV) | OFS = 1 (FL=0EV) | OFS = 1 (FL=0EV) |
| | 0.35   D1   1.3 | D2   3.0 | D3   8.9 | ∞ DISTANCE(m) |

FIG. 10

| (BV) | 0.35 | | D1 1.3 | | D2 3.0 | | D3 8.9 | | ∞ |
|---|---|---|---|---|---|---|---|---|---|
| B4 | OFS= $\frac{1}{8}$ (FL=−3EV) | | OFS= $\frac{1}{4}$ (FL=−2EV) | | OFS= $\frac{1}{2}$ (FL=−1EV) | | ELECTRONIC FLASH OFF (OFF) | | |
| B3 | OFS= $\frac{1}{4}$ (FL=−2EV) | | OFS= $\frac{1}{4}$ (FL=−2EV) | | OFS= $\frac{1}{2}$ (FL=−1EV) | | OFS=1 (FL=0EV) | | |
| B2 | OFS= $\frac{1}{2}$ (FL=−1EV) | | OFS= $\frac{1}{2}$ (FL=−1EV) | | OFS=1 (FL=0EV) | | OFS=1 (FL=0EV) | | |
| B1 | OFS= $\frac{3}{4}$ (FL=−0.42EV) | | OFS= $\frac{3}{4}$ (FL=−0.42EV) | | OFS=1 (FL=0EV) | | OFS=1 (FL=0EV) | | |
| | OFS=1 (FL=0EV) | | OFS=1 (FL=0EV) | | OFS=1 (FL=0EV) | | OFS=1 (FL=0EV) | | |

DISTANCE(m)

F I G. 11

F I G. 1 2

| (BV) | | | | |
|---|---|---|---|---|
| B4 | ELECTRONIC FLASH OFF (OFF) | ELECTRONIC FLASH OFF (OFF) | ELECTRONIC FLASH OFF (OFF) | ELECTRONIC FLASH OFF (OFF) |
| B3 | ELECTRONIC FLASH OFF (OFF) | ELECTRONIC FLASH OFF (OFF) | ELECTRONIC FLASH OFF (OFF) | ELECTRONIC FLASH OFF (OFF) |
| B2 | OFS = $\frac{3}{4}$ (FL=−0.42EV) | OFS = $\frac{3}{4}$ (FL=−0.42EV) | OFS = 1 (FL=0EV) | OFS = 1 (FL=0EV) |
| B1 | OFS = 1 (FL=0EV) | OFS = 1 (FL=0EV) | OFS = 1 (FL=0EV) | OFS = 1 (FL=0EV) |
| | 0.35 | D1  1.3 | D2  3.0 | D3  8.9  ∞  DISTANCE(m) |

| (BV) | ELECTRONIC FLASH OFF (OFF) | ELECTRONIC FLASH OFF (OFF) | ELECTRONIC FLASH OFF (OFF) | ELECTRONIC FLASH OFF (OFF) |
|---|---|---|---|---|
| B4 | OFS= $\frac{1}{4}$ (FL=−2EV) | OFS= $\frac{1}{4}$ (FL=−2EV) | OFS= $\frac{1}{2}$ (FL=−1EV) | OFS= 1 (FL=0EV) |
| B3 | OFS= $\frac{1}{2}$ (FL=−1EV) | OFS= $\frac{1}{2}$ (FL=−1EV) | OFS= 1 (FL=0EV) | OFS= 1 (FL=0EV) |
| B2 | OFS= $\frac{3}{4}$ (FL=−0.42EV) | OFS= $\frac{3}{4}$ (FL=−0.42EV) | OFS= 1 (FL=0EV) | OFS= 1 (FL=0EV) |
| B1 | OFS= 1 (FL=0EV) | OFS= 1 (FL=0EV) | OFS= 1 (FL=0EV) | OFS= 1 (FL=0EV) |
| | 0.35  D1  1.3 | D1  1.3  D2 | D2  3.0  D3 | D3  8.9  ∞  DISTANCE(m) |

ELECTRONIC FLASH LIGHT-EMISSION CONTROLLING METHOD AND APPARATUS AND CAMERA

BACKGROUND OF THE INVENTION

1. Field of the Invention

This invention relates generally to an electronic flash light-emission controlling apparatus and a camera with a built-in electronic flash. More particularly, this invention relates to technics that are applied to a camera that can perform a shooting with an appropriate exposure by utilizing the electronic flash.

2. Description of Related Art

A camera whose electronic flash is used even under conditions (external light brightness) in which an appropriate exposure can be obtained without the light of the electronic flash is already known (U.S. Pat. No. 6,029,015). A method of controlling a camera with an automatic exposure (AE) function so that the exposure by the AE is high when a negative color film is used has been proposed (U.S. Pat. No. 5,159,364 and Japanese Patent Provisional Publication No. 9-211524).

The latitude of the negative film is large enough to allow a high exposure, and thus there is not a problem if the exposure by the electronic flash is added to the exposure by the AE and the light of the electronic flash cancels a shade of the subject formed by a back light or the like. If the same control with the negative film is performed when a positive film is used, however, a photograph of a good quality can not be taken since the latitude of the positive film is small.

SUMMARY OF THE INVENTION

It is therefore an subject of the present invention to provide an electronic flash light-emission controlling method and apparatus and a camera that controls a light of an electronic flash so that a subject can be shot with an appropriate exposure according to the type of a film in use.

The above subject can be accomplished by providing an electronic flash light-emission control method, comprising the steps of: realizing a latitude of a photo film; and adjusting an exposure by an electronic flash according to the latitude of the photo film.

According to the present invention, when a photo film whose latitude is small is used, the exposure by the electronic flash is reduced. Therefore, an over exposure is prevented and a photograph of a good quality can be taken.

The above subject can be accomplished by providing an electronic flash light-emission control apparatus, comprising: a realizing device that realizes a latitude of a photo film; and an electronic flash exposure adjusting device that adjusts an exposure by an electronic flash according to the latitude of the photo film.

The above subject can be accomplished by providing a camera provided with the electronic flash light-emission control apparatus, the camera comprising: a photometry device that determines a brightness of a subject; an automatic exposure adjusting device that automatically adjusts at least one of the following, a diaphragm and a shutter, according to the brightness determined by the photometry device so that an appropriate exposure is obtained; and the electronic flash that emits a light in association with an opening and closing operation of the shutter to give the light to the subject.

According to the present invention, the realizing device realizes the latitude of the film in use, and the electronic flash exposure adjusting device adjusts the exposure by the electronic flash according to the latitude. Therefore, the shooting can be performed with the appropriate exposure with whatever kind of film is used.

BRIEF DESCRIPTION OF THE DRAWINGS

The nature of this invention, as well as other subjects and advantages thereof, will be explained in the following with reference to the accompanying drawings, in which like reference characters designate the same or similar parts throughout the figures and wherein:

FIG. 5 is an explanation drawing showing a correction table;

DETAILED DESCRIPTION OF THE PREFERRED EMBODIMENT

This invention will be described in further detail by way of example with reference to the accompanying drawings.

Figure 1:
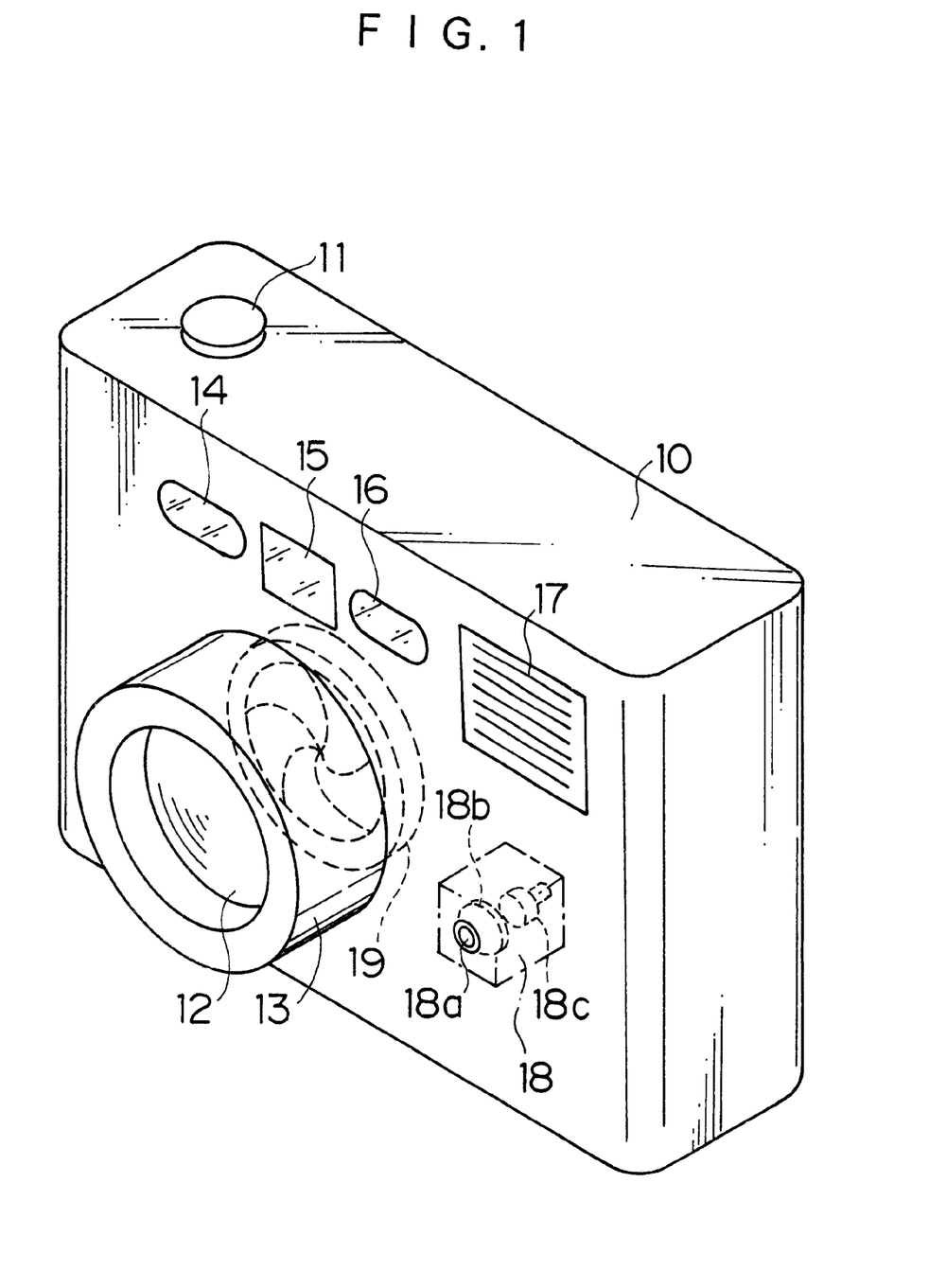
FIG. 1 is a perspective view showing a camera with a built-in electronic flash of an embodiment according to the present invention.
Figure 2:
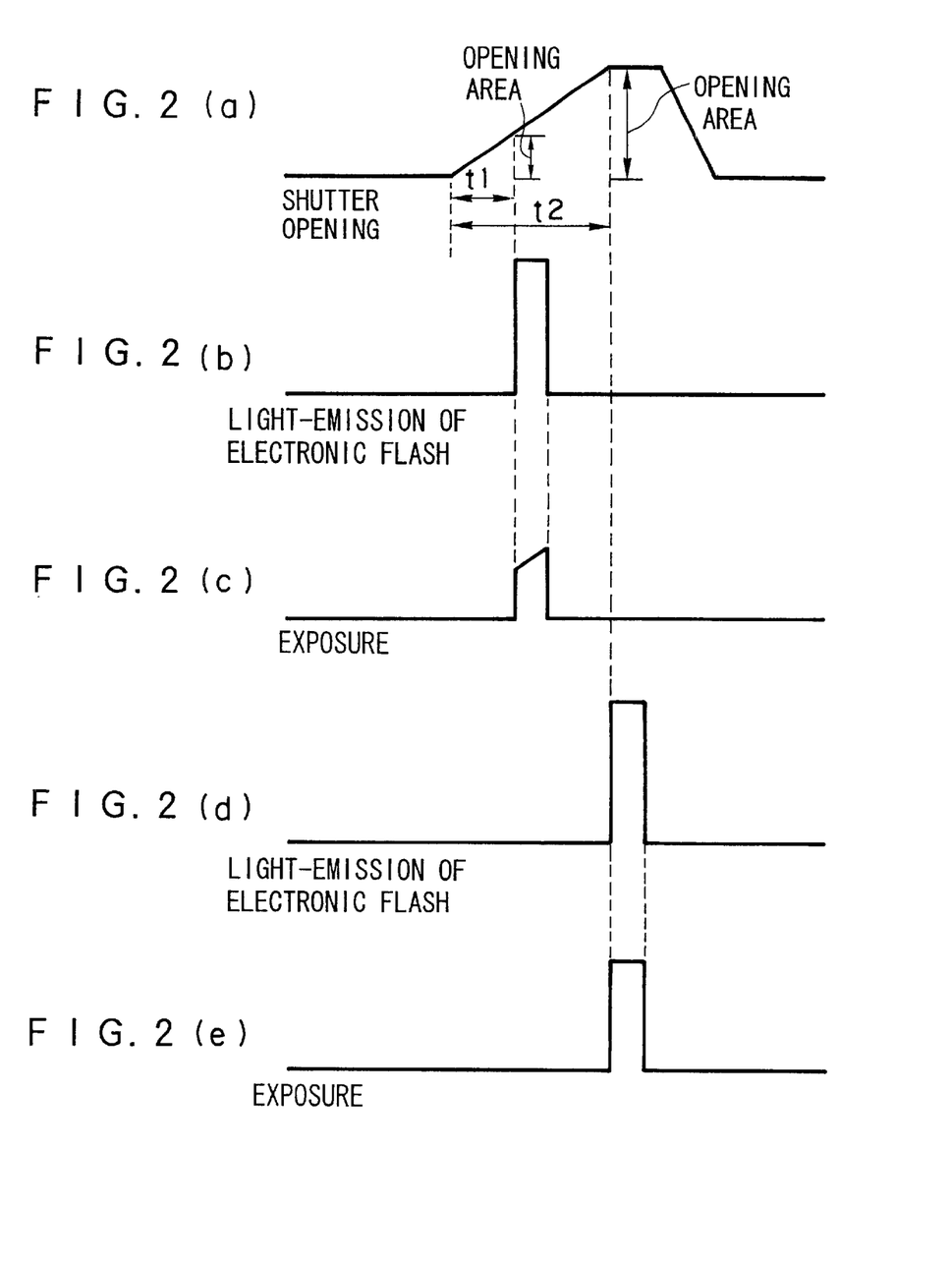
FIGS. 2(a)–2(e) are timing charts showing relationships between opening timings of a shutter and light-emission timings of the electronic flash.

FIG. 1 is a perspective view showing a camera with a built-in electronic flash of an embodiment according to the present invention. The camera 10 is a 24 mm Advanced Photo System (APS) camera. As shown in FIG. 1, a shutter release button 11 is arranged on the top of a camera body that is substantially a rectangular parallelepiped, and a lens barrel 13 in which a lens 12 is incorporated is arranged in the center of the front of the camera body.

An AF light projector 14, a finder 15, an AF light receiver 16 and an electronic flash 17 are arranged in the upper part of the front of the camera body in that order from the left in FIG. 1, and a photometry part 18 for measuring the brightness of the external light is provided at the right side of the lens barrel 13. The AF light projector 14 and the AF light receiver 16 compose a focusing part for measuring the subject distance on the basis of, for example, the principle of triangulation. The photometry part 18 comprises an incident window 18a which is formed on the surface of the camera body, a lens 18b which is arranged on the inside of the incident window 18a and an electric eye photocell 18c which is arranged in the proximity of an image-forming position of the lens 18b. A light receiving surface of the electric eye photocell 18c is arranged a predetermined distance away from the image-forming position of the lens 18b, and thus a perfect subject image is not formed on the light receiving surface of the electric eye photocell 18c and an average quantity of the external light in the whole visual field including the subject is measured by the electric eye photocell 18c.

A shutter 19 for giving a photo film a required exposure is provided on the optical axis of the lens 12 within the camera body. The shutter 19 also works as aperture blades. The electronic flash 17 is automatically used according to the opening timing of the shutter 19 to give the subject an auxiliary light. In the camera of the embodiment, the light-emission timing of the electronic flash 17 is a little different from the opening timing of the shutter 19, so that the exposure of the electronic flash 17 can be adjusted.

The method of adjusting the exposure of the electronic flash 17 will now be explained with reference to the time charts of FIGS. 2(a)–2(e). The time charts of FIGS. 2(a)–2(e) show timings of light-emissions of the electronic flash 17 after the shutter 19 starts working and how much exposures can be obtained. If the electronic flash 17 is used a time t1 after the shutter 19 starts working (FIGS. 2(a) and 2(b)), the opening area of the shutter 19 is still small and a beam of light which exposes the film is small when the electronic flash 17 is used. Thus, the exposure is small (FIG. 2(c)).

On the other hand, if the electronic flash 17 is used a time t2 after the shutter 19 starts working (FIG. 2(d)), the opening area of the shutter 19 is the largest and a beam of light which exposes the film is large. As a result, the exposure is almost twice as much as the exposure in the case that the electronic flash 17 is used the time t1 after the shutter 19 starts working (FIG. 2(e)). Thus, the exposure by the electronic flash 17 can be freely adjusted without changing the amount of the emitted light of the electronic flash 17 by adjusting the light-emission timing of the electronic flash 17.

In this embodiment, the light-emission and the light-emission timing of the electronic flash 17 for obtaining the optimum exposure for the photographing are controlled according to the subject distance measured by the AF light projector 14 and the AF light receiver 16, the external light brightness in the visual field measured by the photometry part 18 and the latitude of the photo film in use.

Figure 3:
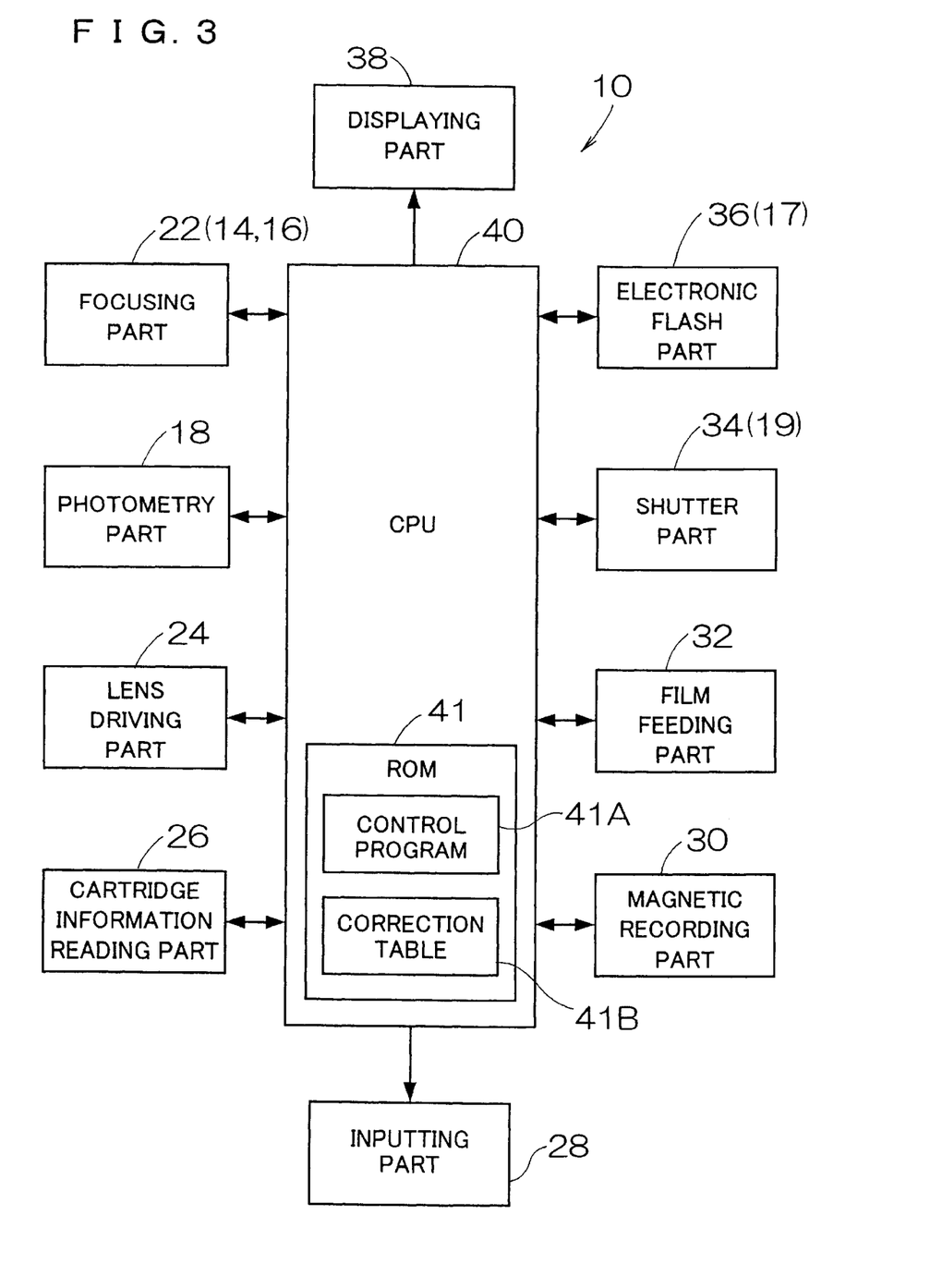
FIG. 3 is a block diagram showing the structure of the camera in FIG. 1.

FIG. 3 is a block diagram showing the structure of the camera 10. As shown in FIG. 3, the camera 10 comprises a focusing part 22, the photometry part 18, a lens driving part 24, a cartridge information reading part 26, an inputting part 28, a magnetic recording part 30, a film feeding part 32, a shutter part 34, an electronic flash part 36, a displaying part 38 and a central processing unit (CPU) 40 that controls these parts.

The focusing part 22 is equivalent to the AF light projector 14 and the AF light receiver 16 explained in FIG. 1. The lens driving part 24 includes an electric motor for zooming and focusing the taking lens 12.

The cartridge information reading part 26 includes a device for reading a data disc of a cartridge. The data disc is a disc on which a barcode is printed, and information such as the ISO speed, the number of frames of the film and the type of the film is read when the data disc is rotated forward or backward.

The inputting part 28 includes a mode switching dial, a zoom switch, a electronic flash mode setting switch and operation keys (not shown), and the inputting part 28 is an interface part for the user to operate the camera 10 and input various commands.

The magnetic recording part 30 has a magnetic head, and the magnetic recording part 30 writes and reads magnetic information in and from a magnetic layer formed on the photo film.

The film feeding part 32 has a feeding motor, and the film feeding part 32 automatically winds and rewinds the film. The shutter part 34 includes a driving device for the shutter 19 explained in FIG. 1. The electronic flash part 36 is equivalent to the electronic flash 17 explained in FIG. 1. The displaying part 38 is, for example, a liquid crystal panel, and a variety of information on the state of the camera 10 such as the residual amount of a battery, a self-timer, date display, a film counter and shooting mode display is displayed on the displaying part 38.

The CPU 40 is a processing part that controls the whole camera 10, and it controls the light-emission timing of the electronic flash part 36 on the basis of a control program 41A stored in a ROM 41. A data table (correction table) 41B of correction values that are used for calculating the exposure by the electronic flash 17, and the CPU 40 adjusts the exposure by the electronic flash 17 that will be described later by the use of the correction table 41B.

The CPU 40 controls the shooting operation in response to a signal inputted from the shutter release button 11, and controls the parts according to various signals inputted from the inputting part.

The CPU 40 receives a half-push signal or a full-push signal from the shutter release button 11 according to the pushing operation. When the CPU 40 receives the half-push signal from the shutter release button 11, the CPU 40 transmits a signal for measuring the subject distance to the AF light projector 14 and transmits a signal for measuring the external light brightness within the visual field to the photometry part 18. The AF light projector 14 (and the AF light receiver 16) and the photometry part 18 perform the focusing and the photometry, respectively, on the basis of the signals. Further, when the CPU 40 receives the full-push signal from the shutter release button 11, the CPU 40 transmits a signal for light-emission to the electronic flash 17 and transmits a signal for opening and closing the shutter 19 to the shutter 19.

An explanation will be given of the procedure in which the CPU 40 controls the light-emission timing on the basis of the control program 41A with reference to the flow chart of FIG. 4.

First, when the power switch is turned on, the initial processing such as clearing the memory built in the CPU 40 and setting an I/O port is performed (S100). Then, the processing is suspended until any switch is operated (S101). The switch is a self-timer switch, a zoom switch (not shown) or the like as well as the shutter release button 11. When any of the switches is operated (S102), it is determined which switch has been operated (S103). If a switch other than the shutter release button 11 has been operated, the processing for the switch is performed (S104).

When it is detected that the shutter release button 11 has been half pushed at S103, the residual capacity of the power source battery is determined (S105). Then, the signal from the CPU 40 is transmitted to the photometry part 18, which measures the external light brightness in the visual field (S106). Furthermore, the signal from the CPU 40 is transmitted to the AF light projector 14, and the AF light projector 14 and the AF light receiver 16 measure the subject distance (S107). Then, an exposure value EV which is a control value for the shutter 19 is calculated from the apex value (BV) of the external light brightness found at S106 and the apex value (SV) of the film speed by the following equation 1 (S108), $$EV=SV+BV \qquad \text{equation 1.}$$

The shutter speed and the diaphragm value for obtaining the exposure required for photographing are determined from the calculated EV.

Then, an AV for determining the light-emission timing of the electronic flash 17 is calculated (S108). The AV is a value corresponding to the opening area of the shutter 19 when the electronic flash 17 is used. The electronic flash 17 should be used when the opening area that gradually increases after the shutter 19 starts working reaches the AV, and thus the light-emission timing of the electronic flash 17 can be determined from the AV.

In order to calculate the AV, a DV is calculated from the subject distance found at S107 by the equation 2, and a GV is calculated from a guide number (GNo.) by the equation 3;

$$DV=-2\log_2 D \qquad \text{equation 2,}$$

$$GV=2\log_2 GNo. \qquad \text{equation 3.}$$

Then, an offset value (OFS value) which is a correction value for the exposure by the electronic flash 17 is found on the correction table 41B stored in the ROM 41. Multiple types of the correction tables 41B are stored for different latitudes of photo films. Latitudes of films are different according to types and manufacturers (makers) of the films. For example, the latitude of a negative color film is from +3 to −1, and the latitude of a positive color film is from +½ to −½. Thus, the latitude of the film in use is realized according to the information read from the cartridge information reading part 26 or the magnetic information read from the magnetic recording part 30, and a suitable correction table 41B for the latitude of the film is selected.

FIG. 5 shows a correction table 41B for a negative color film. As shown in FIG. 5, the parameters of the correction table 41B are the external light brightness (BV) within the visual field and the subject distance. In FIG. 5, the external light brightness is classified into five levels (lower than B1, between B1 and B2, between B2 and B3, between B3 and B4 and higher than B4) and the subject distance is classified into four levels (shorter than D1, between D1 and D2, between D2 and D3 and longer than D3). The external light brightness B2 is higher than B1, and B3 is higher than B2, and B4 is higher than B3; and the distance D2 is longer than D1, and D3 is longer than D2. The distances D1–D3 are, for example, 1.3 m, 2.0 m and 8.9 m, respectively.

Figure 4:
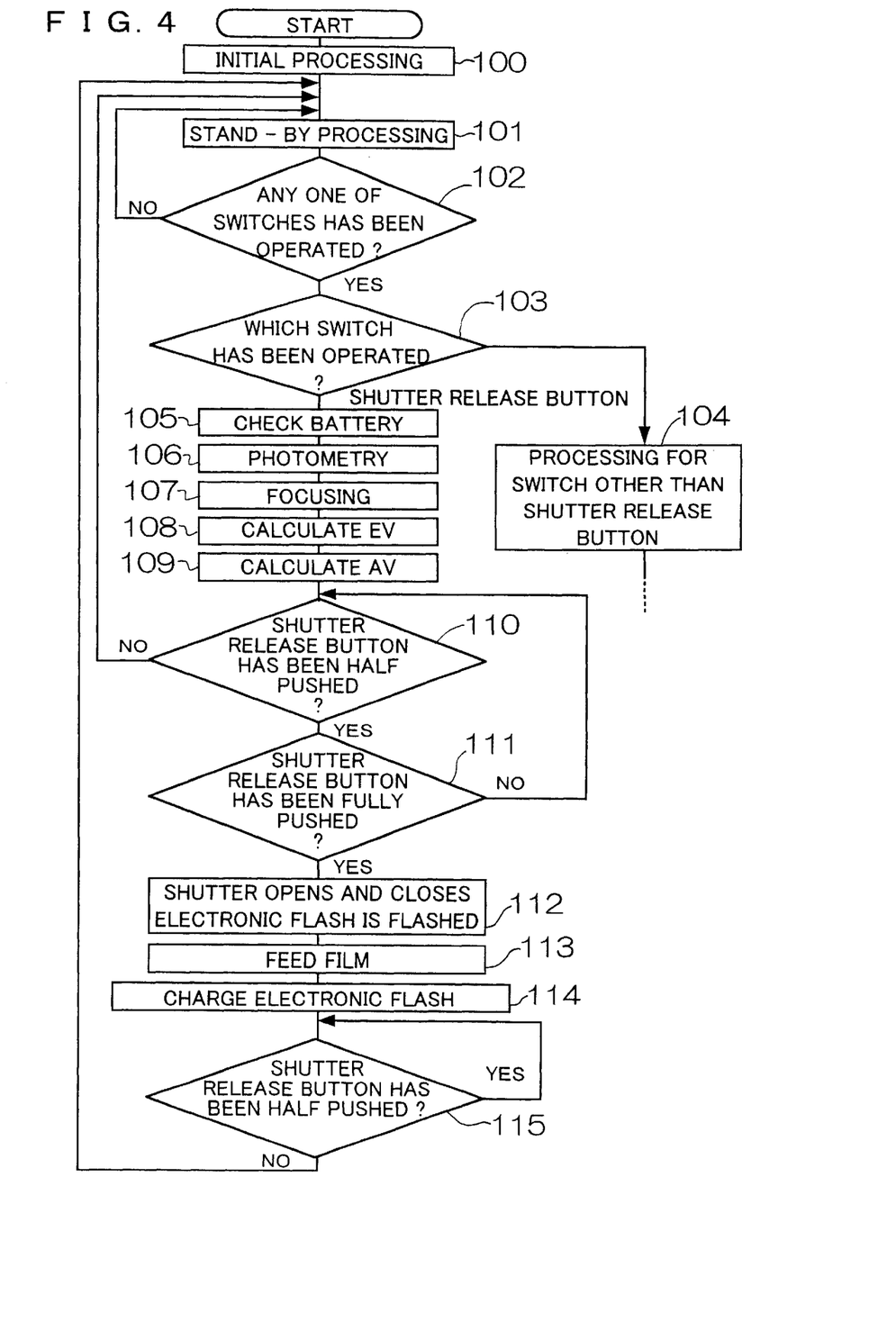
FIG. 4 is a flow chart showing a procedure of a timing control of the light-emission of the electronic flash.

The OFS value is found from the external light brightness within the visual field measured at S106 in FIG. 4 and the subject distance measured at S107 with reference to the correction table 41B. In FIG. 5, when the distance is between the D1 and the D2 and the brightness is between the B2 and the B3, the OFS value is ¼. When the distance is longer than the D3 and the brightness is between the B1 and the B2, the OFS value is 1. An FL is calculated from the OFS value by the following equation 4, $$FL=\log_2 OFS \qquad \text{equation 4.}$$

The AV is calculated from the DV, the GV, the FL found by equations 2, 3 and 4 and the film speed (SV) by the following equation 5 (S109), $$AV=GV+SV+DV-FL \qquad \text{equation 5.}$$

When the film speed is ISO 100, 200, 400, 800, 1600 . . . , the SV is 5, 6, 7, 8, 9 . . . , respectively.

The processing is suspended until the shutter release button 11 is half pushed and fully pushed (S110, S111). If the user releases his or her finger from the shutter release button 11 instead of fully pushing the shutter release button 11, the processing returns to S101. If the shutter release button 11 is fully pushed, the shutter 19 is opened and closed to perform a shooting. The electronic flash 17 is used when the opening area of the shutter 19 reaches the AV calculated at S109 (S112). The exposure required for photographing can be obtained by the electronic flash 17.

The film is fed (S113) after the shutter 19 is closed, and the electronic flash 17 is charged (S114). Then, the processing is suspended while the shutter release button 11 is being half pushed (S115), and after the user releases the finger from the shutter release button 11, the processing returns to S101.

In the camera 10, when the AV is calculated at S109, the exposure by the electronic flash 17 is adjusted on the basis of the correction table 41B. As described above, in the correction table 41B, the subject distance is classified into the four levels and the external light brightness within the visual field is classified into the five levels; and the OFS value which is the correction value for the exposure by the electronic flash 17 is determined with respect to each combination of the levels (see FIG. 5). Basically, when the external light brightness is lower than the B1, the OFS values are 1, that is, the exposure by the electronic flash 17 is the maximum exposure (100%) since the external light is not sufficient for the required exposure. When the external light brightness is higher than the B1, the OFS values are within the range between ¾ and ⅛, that is, the exposure by the electronic flash 17 is lower than the maximum exposure. In this case, the smaller the subject distance is, the lower the OFS value is.

Figure 6:
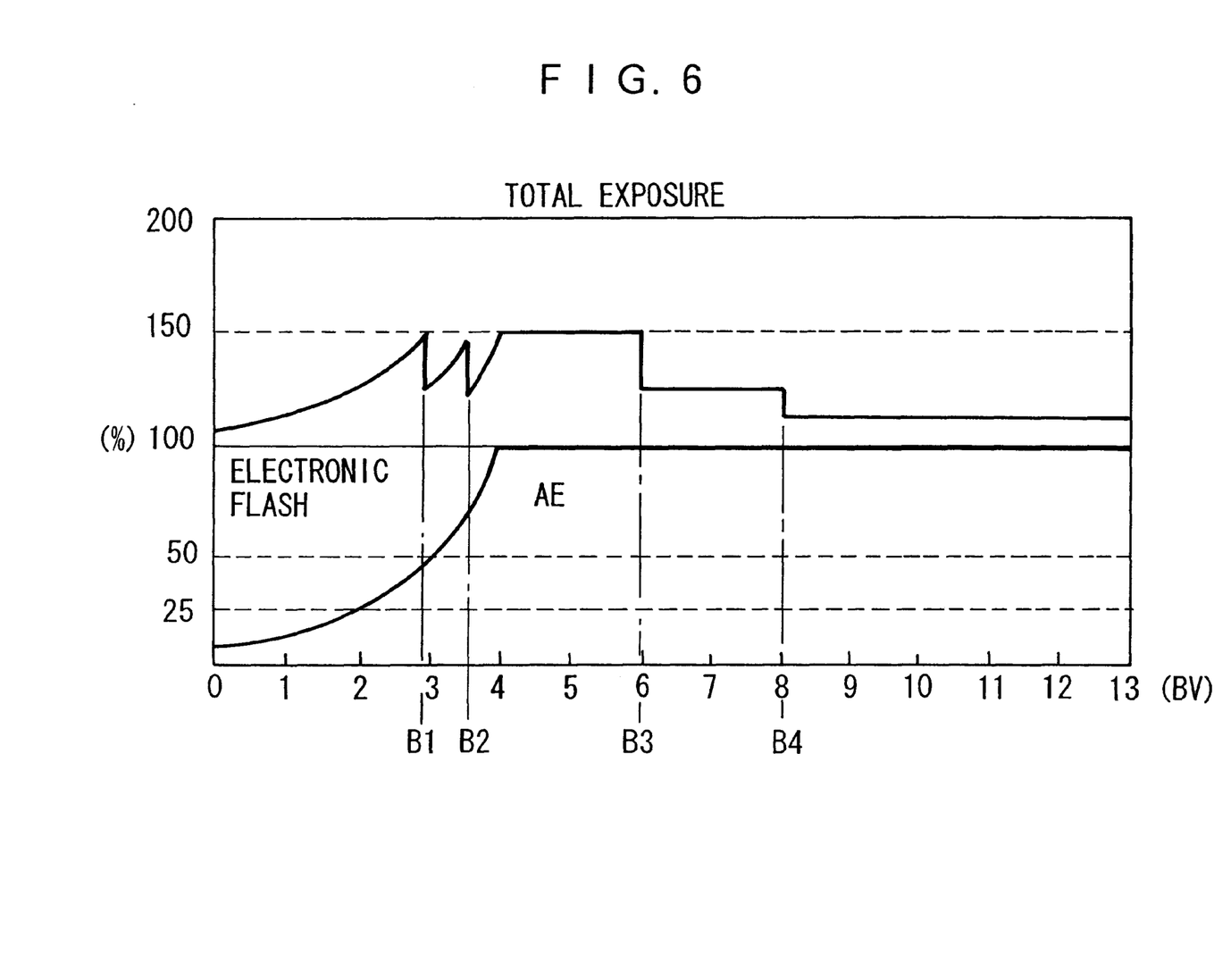
FIG. 6 is a graph diagram showing an electronic flash control when a negative film is used.

The relationship between the exposure by the electronic flash 17 controlled according to the correction table 41B in FIG. 5 and the exposure by the external light will hereunder be explained with reference to the graph in FIG. 6. In FIG. 6, the abscissa is the brightness (BV) and the ordinate is the exposure. The exposure of 100% is the reference exposure that is appropriate for the AE control, and the exposure by the electronic flash 17 is added to the exposure by the external light. In FIG. 6, the film speed is ISO 100 and the subject distance is shorter than the D1 (also in later-described FIGS. 7, 9, 11 and 13).

As shown in FIG. 6, when the external light brightness (BV) is lower than 4, the shutter 19 is open only for a predetermined time to prevent a camera shake, and thus the external light is not sufficient for the reference exposure (100%) required for photographing. Therefore, the limit of the brightness (BV) for the so-called AE control is around 4.

When the external light brightness (BV) is lower than 4; the higher the external light brightness is, the higher the exposure by the external light is. When the external light brightness (BV) is higher than 4, the AE control effectively functions to control the shutter 19 so that the exposure of the external light is kept at the reference exposure (100%). Thus, the exposure by the external light is constant when the external light brightness (BV) is higher than 4.

On the other hand, the exposure by the electronic flash 17 is the exposure required for photographing (100%) when the external light brightness is lower than the B1. The OFS values are 1, ¾, ½, ¼ and ⅛ when the external light brightness is lower than the B1, between the B1 and the B2, between the B2 and the B3, between the B3 and the B4 and higher than the B4, respectively, in the correction table 41B (see FIG. 5).

The total exposure of the film is the sum of the exposure by the external light and the exposure by the electronic flash 17. When the brightness (BV) is lower than 4; the higher the brightness is, the higher the exposure by the external light. At the brightnesses (the B1 and the B2) which are lower than 4, the exposures by the electronic flash 17 are switched. The brightnesses (B1, B2, B3 and B4) at which the exposures by the electronic flash 17 are switched are called "SWITCH BRIGHTNESSES". In FIG. 6, when the brightness is lower than the switch brightness B1, the exposure by the electronic flash 17 is the maximum value (100%); and when the brightness is between the switch brightnesses B1 and B2, the exposure by the electronic flash 17 is 75% of the maximum value; and when the brightness is between the switch brightnesses B2 and B3, the exposure by the electronic flash 17 is 50% of the maximum value. In this way, the total exposure is prevented from being excessively larger than the appropriate exposure. The exposures by the electronic flash 17 and the switch brightness are determined in such a manner that the total exposure can always be appropriate.

In case of the negative color film whose latitude is relatively large, the camera can perform a fine shooting by adding the exposure by the electronic flash 17 to the exposure by the external light. Especially, in the embodiment, the exposure by the electronic flash 17 is prevented from being excessively large when the external light brightness (BV) is around 4 which is the limit value for the AE control. Therefore, the balance in quantity of light between the subject and the background can be kept, and the subject can be prevented from being whitened and standing out from the background.

If the external light brightness (BV) is higher than 4, the exposure by the electronic flash 17 gradually decreases as the external light brightness becomes higher. When the brightness is between the B2 and the B3, the exposure is 50% of the maximum value; and when the brightness is between the B3 and the B4, the exposure is 25% of the maximum value; and when the brightness is higher than the B3, the exposure is 12.5% of the maximum value.

When the electronic flash 17 is used in such a manner that the exposure by the electronic flash 17 is fixed even if the subject distance is short and the external light brightness is high, the ratio of the background to the subject in quantity of light is lowered. As a result, the background on the print is dark even though the external light is enough. In the camera 10, the exposure by the electronic flash 17 gradually decreases as the external light brightness becomes higher, and thus the ratio of the background to the subject in quantity of light is not lowered even if the external light brightness is high. Therefore, the background on the print is not dark even when the brightness is high, and a special ambience of the photograph is not ruined. As shown on the correction table in FIG. 5, the exposure of the electronic flash 17 gradually decreases as the external light brightness becomes higher even if the subject distance is longer than the D1, and therefore the same effect can be achieved even if the subject distance is long.

The relationships between the exposures by the electronic flash 17 and the exposures by the external light when the subject distances are between the D1 and the D2, between the D2 and the D3 and longer than the D3 are not shown, and the exposures by the electronic flash 17 are controlled according to the correction table in FIG. 5 in those cases. Unlike the case (the subject distance is shorter than the D1) in FIG. 6, if the subject distance is between the D1 and the D2, the exposure by the electronic flash 17 when the external light brightness is higher than the B4 is the same as that when the external light brightness is between the B3 and the B4.

It has been proved by an experiment that the balance in quantity of light between the subject and the background is not lost when the external light brightness is higher than the B4 if the subject distance is between the D1 and the D2. Therefore, the exposure by the electronic flash 17 when the external light brightness is higher than the B4 is the same as that when the external light brightness is between the B3 and the B4.

Unlike the case (the subject distance is shorter than the D1) in FIG. 6, if the subject distance is between the D2 and the D3, the exposure by the electronic flash 17 is 100% of the maximum value when the external light brightness is lower than the B3, and it is 50% of the maximum value when the external light brightness is higher than the B3.

It has been proved by an experiment that, if the subject distance is longer than the D2, the effect of decreasing the exposure by the electronic flash 17 when the external light brightness (BV) is lower than 4 is not great when compared with the case in which the subject distance is longer than the D2, and the balance in quantity of light between the subject and the background is not lost even if the total exposure is higher than the appropriate exposure whatever the external exposure brightness is.

Likewise the case in which the subject distance is between the D2 and the D3, if the subject distance is longer than the D3, the exposure by the electronic flash is 100% of the maximum value when the external light brightness is lower than the B3. But, unlike the case in which the subject distance is between the D2 and the D3, if the subject distance is longer than the D3, the electronic flash 17 is not used when the external light brightness is higher than the B3. This is because it is hard for the light of the electronic flash 17 to reach the subject when the subject distance is longer than the D3, and the photographing is hardly influenced by the electronic flash 17 when the external light brightness is higher than the B2.

Figure 7:
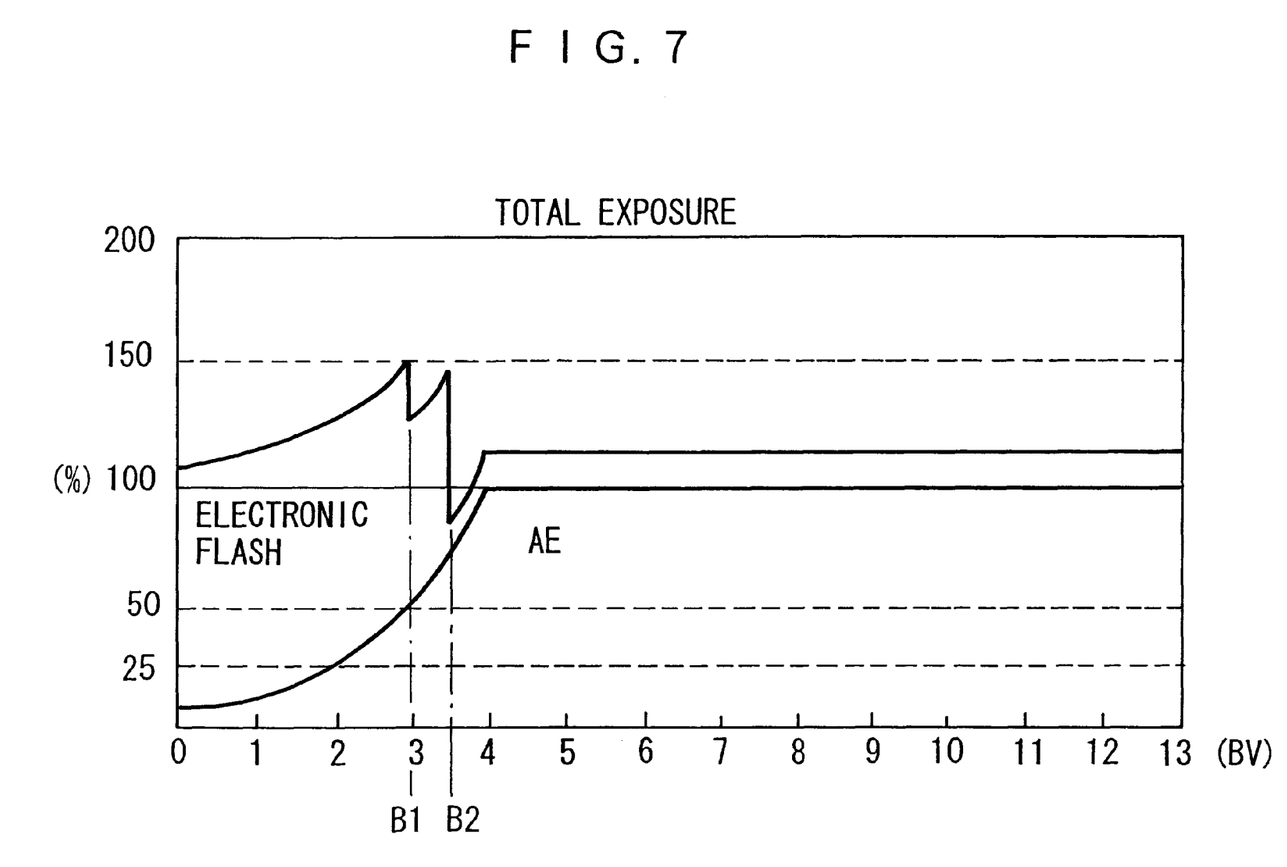
FIG. 7 is a graph diagram showing a first embodiment of an electronic flash control when a positive film is used.

FIG. 7 is a graph showing the electronic flash control when the positive film is used. If the electronic flash control explained in FIGS. 5 and 6 is performed with the positive film, a photograph of a good quality can not be taken since the latitude of the positive film is smaller than that of the negative film.

Figure 8:
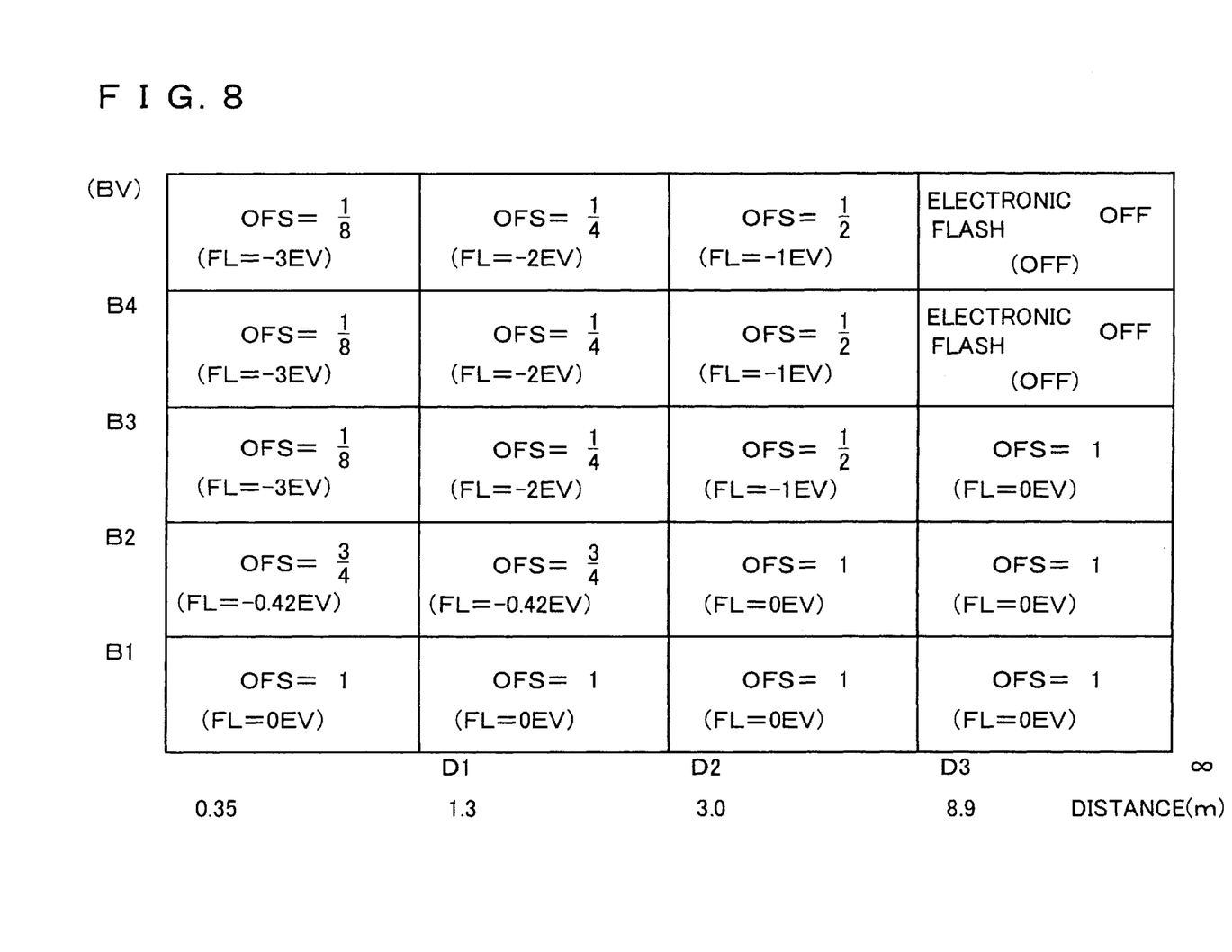
FIG. 8 is an explanation drawing showing a correction table for the electronic flash control in FIG. 7.

Thus, the exposure by the electronic flash 17 is controlled as shown in FIG. 7. FIG. 8 is a correction table for the electronic flash control in FIG. 7. The switch brightnesses B1, B2, B3 and B4 in FIG. 8 are set independently from those in FIGS. 5 and 6.

In the electronic flash control in FIG. 7, the OFS value is ⅛ when the external light brightness is higher than B2. Therefore, a photograph of a good quality can be taken even with the positive film whose latitude is small.

Other embodiments of the electronic flash control with the positive film will be explained.

Figure 9:
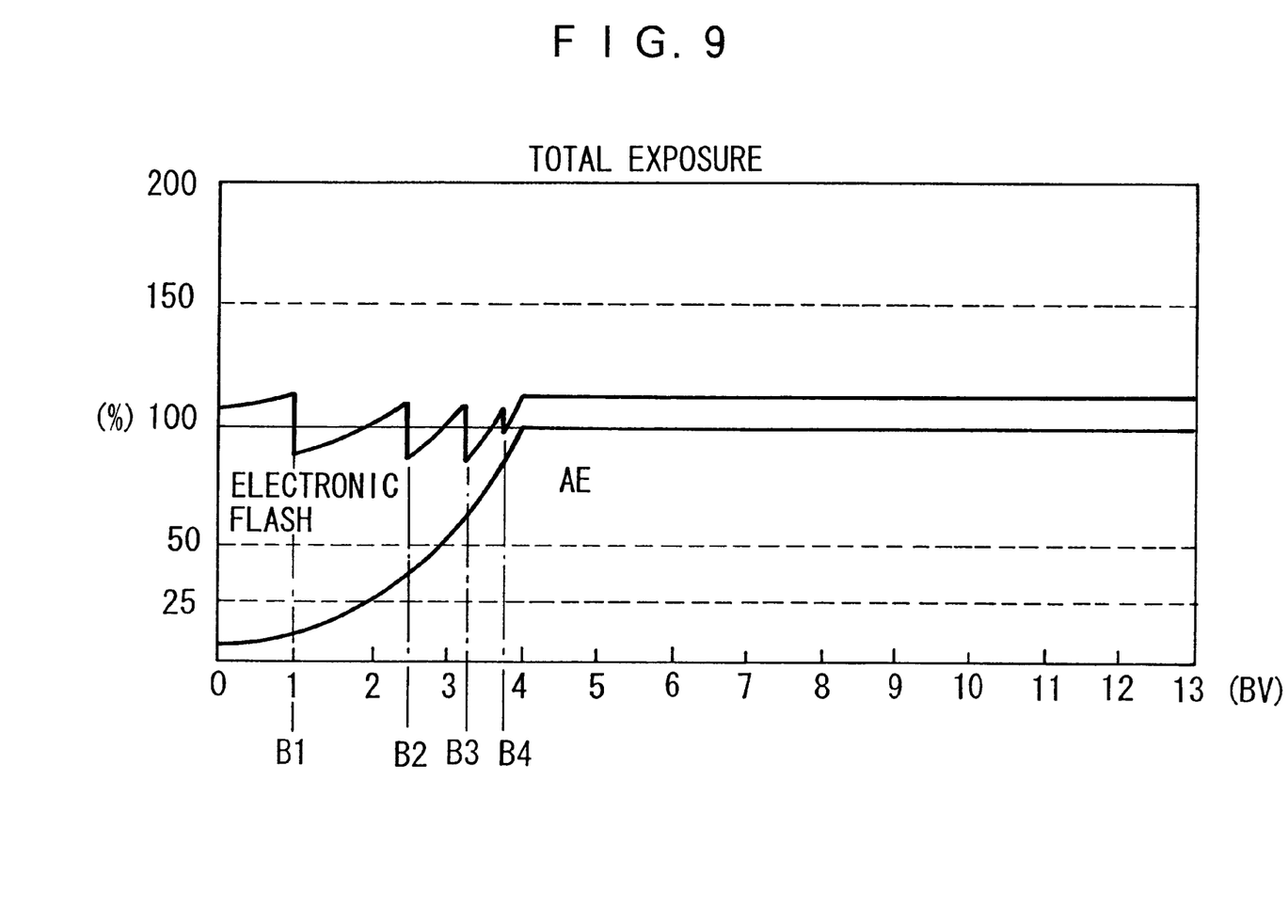
FIG. 9 is a graph diagram showing a second embodiment of an electronic flash control when the positive film is used.
Figure 10:
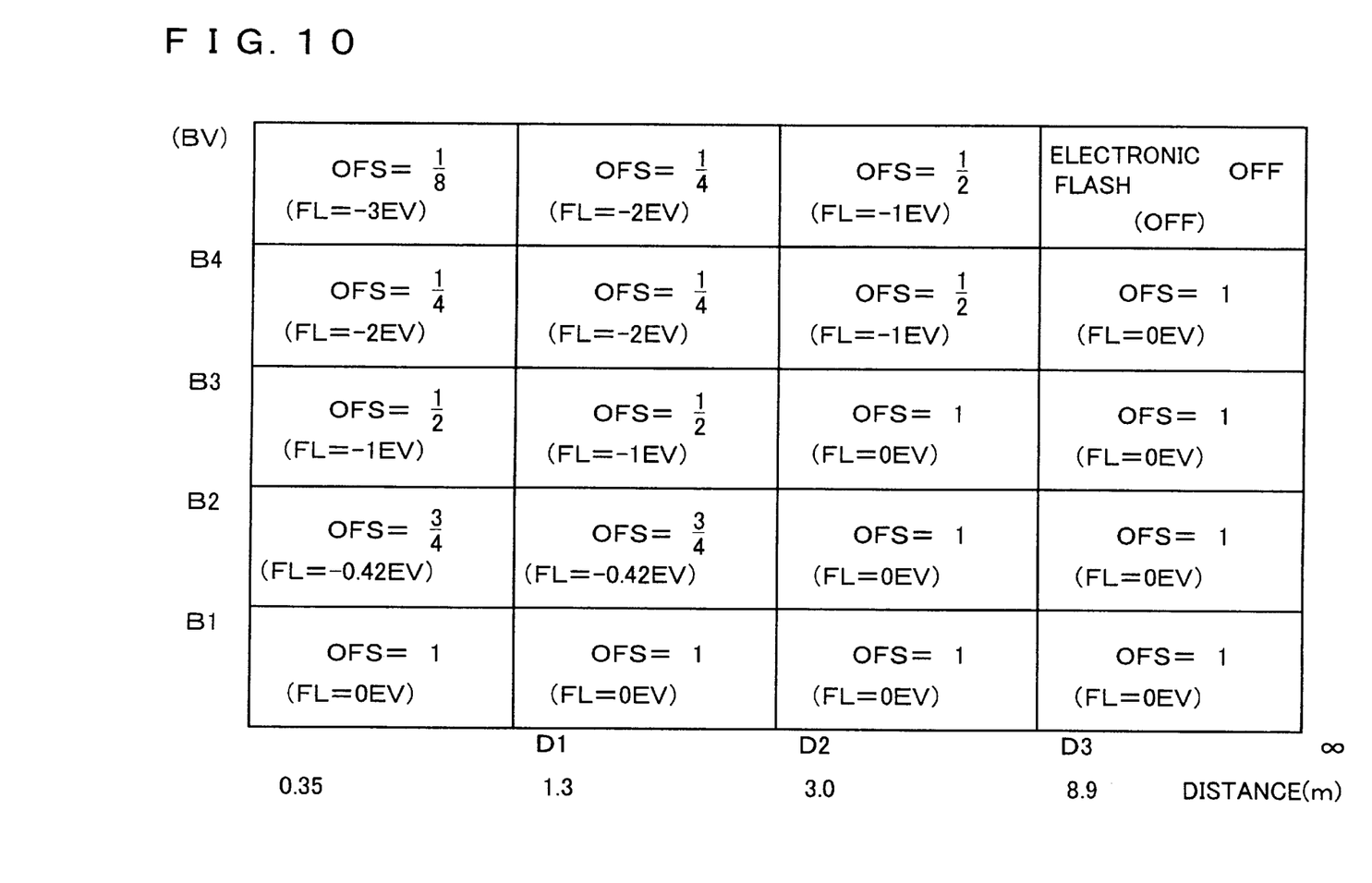
FIG. 10 is an explanation drawing showing a correction table for the electronic flash control in FIG. 9.

FIG. 9 is a graph showing the second embodiment of the present invention, and FIG. 10 is a correction table for the electronic flash control in FIG. 9. As shown in FIGS. 9 and 10, in the second embodiment, the exposure by the electronic flash 17 is controlled so that the total exposure is almost the same as the reference exposure (for example, within the range of ±15%) even when the brightness (BV) is lower than 4 that is the limit for the AE control.

Figure 11:
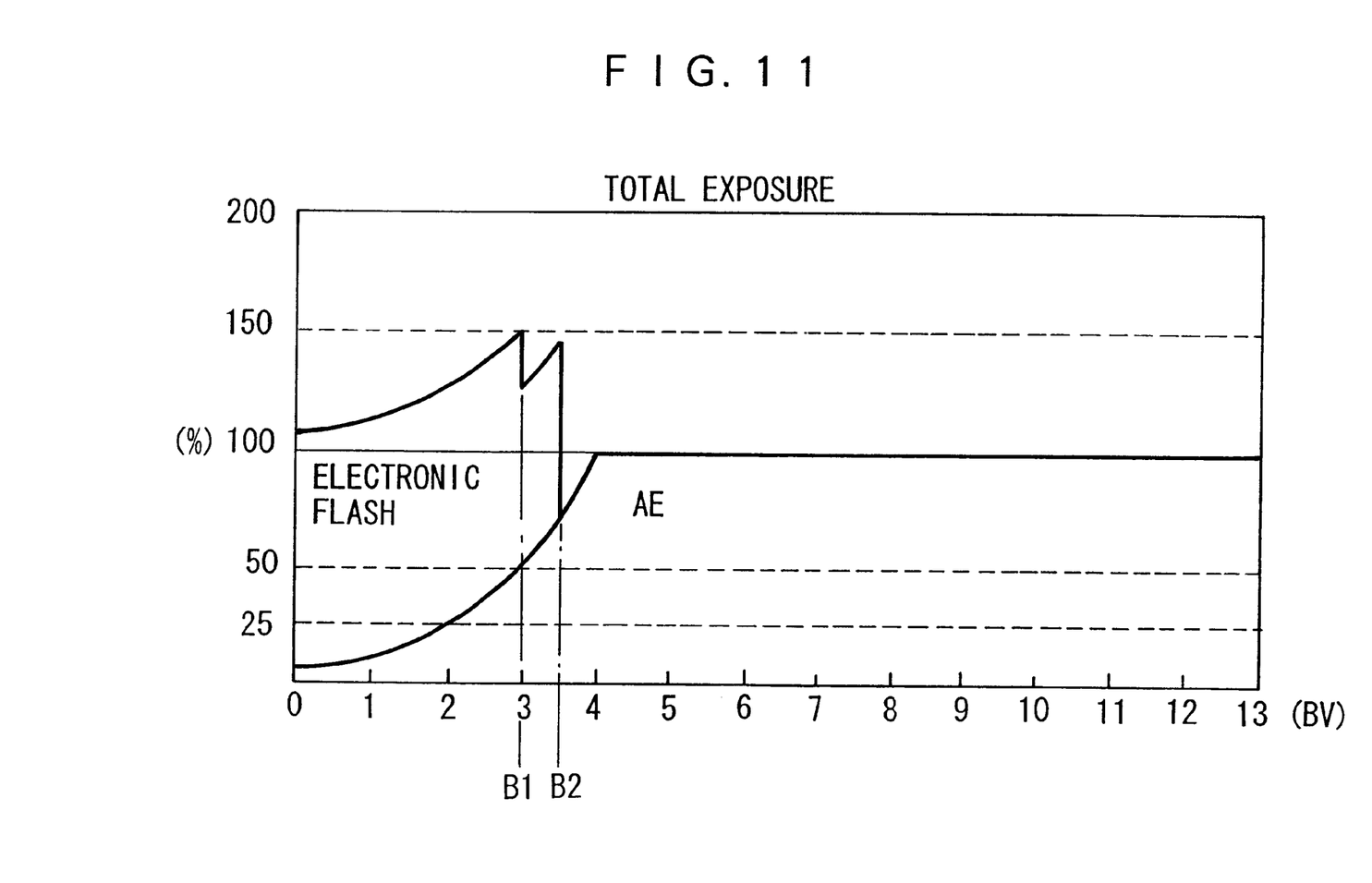
FIG. 11 is a graph diagram showing a third embodiment of an electronic flash control when the positive film is used.
Figure 12:
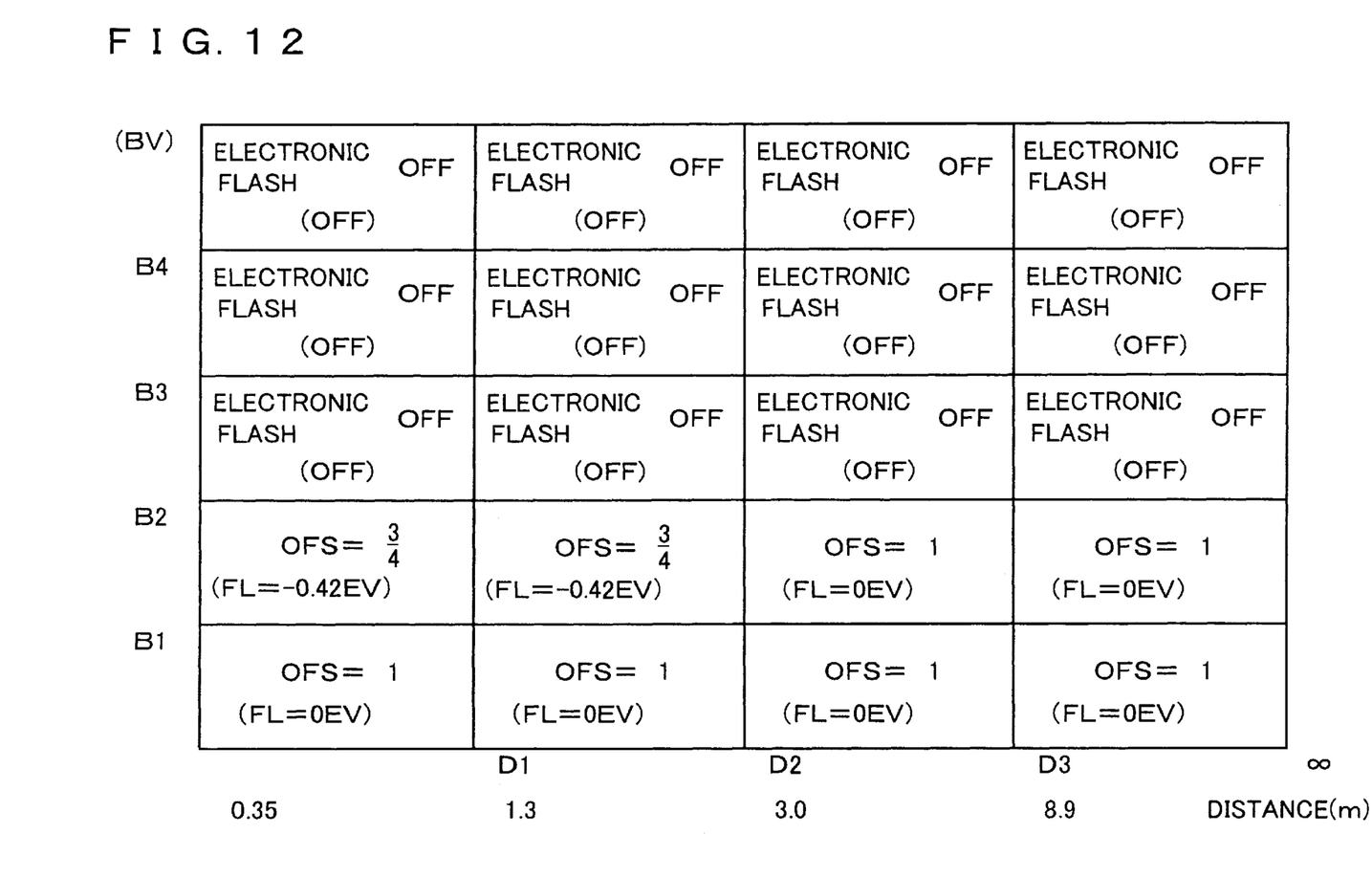
FIG. 12 is an explanation drawing showing a correction table for the electronic flash control in FIG. 11.

FIG. 11 is a graph showing the third embodiment of the present invention, and FIG. 12 is a correction table for the electronic flash control in FIG. 11. As shown in FIGS. 11 and 12, in the third embodiment, the electronic flash 17 is not used when the brightness is high and the AE control is possible.

Figure 13:
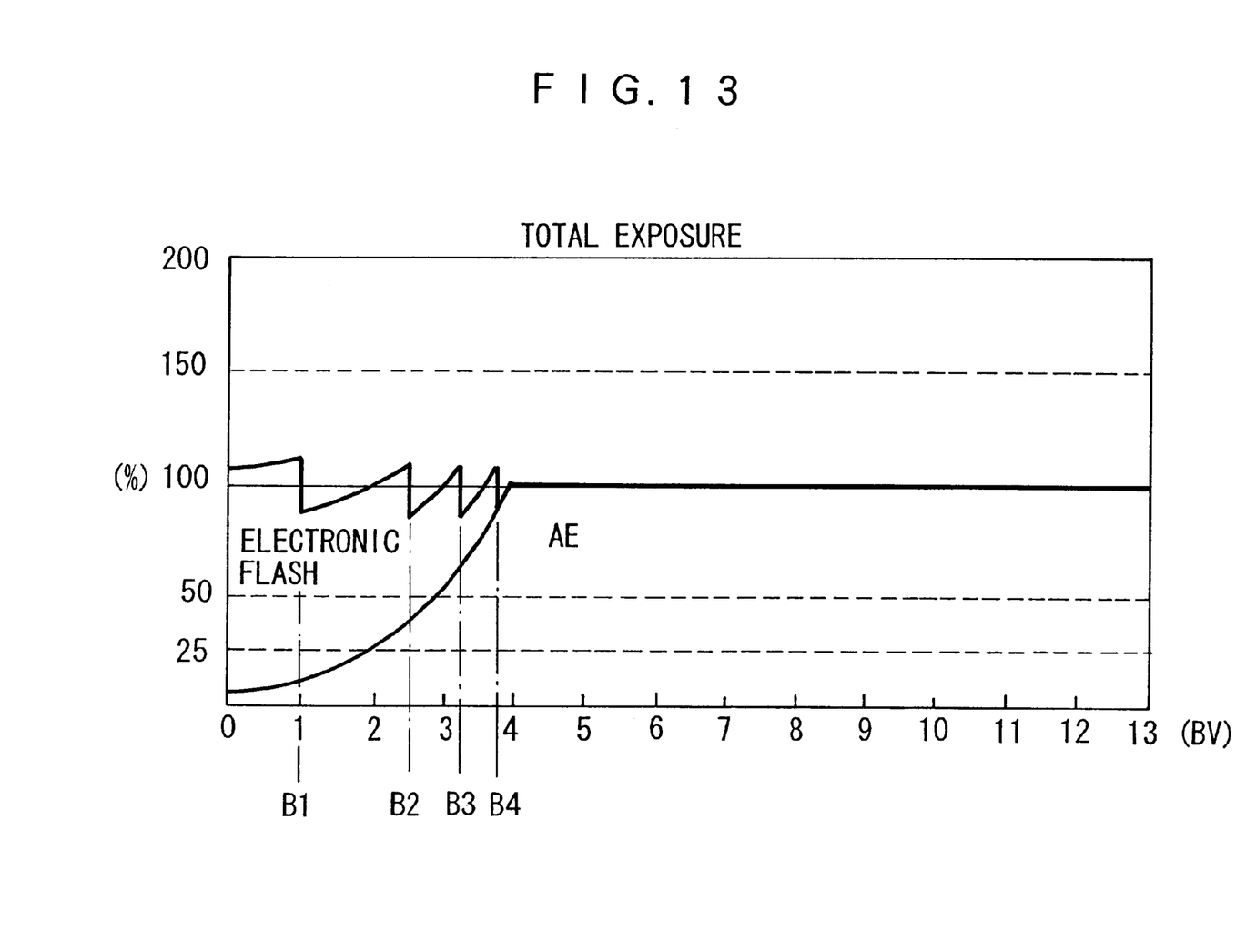
FIG. 13 is a graph diagram showing a fourth embodiment of an electronic flash control when the positive film is used.
Figure 14:
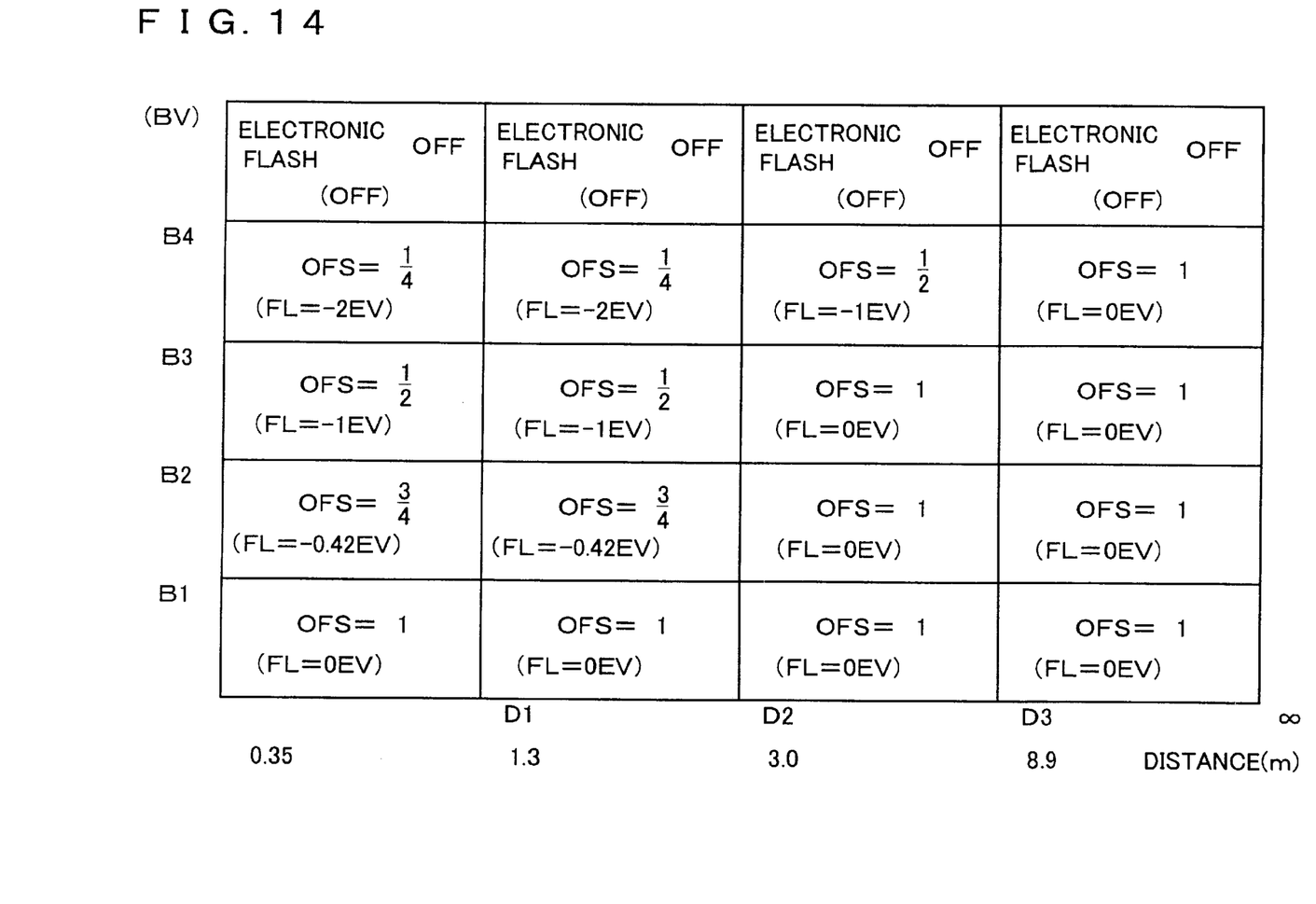
FIG. 14 is an explanation drawing showing a correction table for the electronic flash control in FIG. 13.

FIG. 13 is a graph showing the fourth embodiment of the present invention, and FIG. 14 is a correction table for the electronic flash control in FIG. 13. As shown in FIGS. 13 and 14, in the forth embodiment, the electronic flash 17 is not used when the brightness is high and the AE control is possible, and the exposure by the electronic flash 17 is controlled so that the total exposure is almost the same as the reference exposure when the brightness is lower than the limit for the AE control.

In these embodiments, the correction tables in FIGS. 5, 8, 10, 12 and 14 are explained. But the correction table is not limited to these correction tables, and the external light brightness and the subject distance may be classified into more levels or less levels.

In these embodiments, the films whose film speeds are ISO 100, but another film with another film speed may be applied in the same way if the BV is changed.

The present invention is not limited to these embodiments. For example, as explained in FIG. 2, the light-emission timing of the electronic flash 17 is a little different from the opening timing of the shutter 19 so that the exposure by the electronic flash 17 is adjusted. But the emission amount of the light of the electronic flash 17 may be adjusted so that the exposure by the electronic flash 17 is adjusted.

In the camera 10 in FIG. 1, the active autofocusing with the AF light projector 14 and the AF light receiver 16 is adopted, but the passive autofocusing may be adopted. The present invention is applied to the camera 10 with the built-in electronic flash 17, but it may be applied to an electronic flash outside a camera.

The present invention may be applied to various cameras in which a 35 mm film and other films as well as the APS camera. A cartridge of the 35 mm film is has a camera automatic determination code that is called a DX code. The camera automatic determination code has a conductive part and an insulating part, and the camera automatic determination code represents a film speed code, a frame number determination code, a latitude determination code and so on by a pattern of an electric contact range. A DX code camera has an electric contact part for reading the camera automatic determination code, and automatically reads the codes after the film is loaded. The latitude of the film may be realized with the camera automatic determination code.

Moreover, a luster code on an end (tongue) of the film may be read and a barcode on the side of a film cartridge may be read so that the latitude of the film is realized.

As set forth hereinabove, the latitude of the film is realized and the exposure by the electronic flash is adjusted according to the latitude of the film. Therefore, a photograph of a good quality can be taken even with a film whose latitude is small.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An electronic flash light-emission control method, comprising the steps of:
   realizing a latitude of a photo film; and
   adjusting an exposure by an electronic flash according to the latitude of the photo film.

2. The electronic flash light-emission control method as defined in claim 1, wherein the exposure by said electronic flash is adjusted in such a manner that the smaller the latitude of said photo film is, the smaller the exposure by said electronic flash is.

3. The electronic flash light-emission control method, as defined in claim 1; wherein said
   adjusting of exposure is controlling timing of said electronic flash.

4. An electronic flash light-emission control apparatus, comprising:
   a realizing device that realizes a latitude of a photo film; and
   an electronic flash exposure adjusting device that adjusts an exposure by an electronic flash according to the latitude of the photo film.

5. A camera provided with the electronic flash light-emission control apparatus as defined in claim 4, said camera comprising:
   a photometry device that determines a brightness of a subject;
   an automatic exposure adjusting device that automatically adjusts at least one of the following, a diaphragm and a shutter, according to the brightness determined by said photometry device so that an appropriate exposure is obtained; and
   said electronic flash that emits a light in association with an opening and closing operation of said shutter to give the light to said subject.

6. The camera as defined in claim 5, wherein said electronic flash is used to perform a shooting with a higher exposure than a required exposure within the latitude even if the required exposure can be obtained without the light of said electronic flash.

7. The camera as defined in claim 6, wherein said electronic flash exposure adjusting device adjusts the exposure by said electronic flash in such a manner that the smaller the latitude of said photo film is, the smaller the exposure by said electronic flash is.

8. The camera as defined in claim 6, wherein said electronic flash exposure adjusting device prohibits the light-emission of said electronic flash when the latitude is smaller than a predetermined latitude and the required exposure can be obtained without the light of said electronic flash.

9. The camera as defined in claim 5, wherein said electronic flash is used when an external light brightness determined by said photometry device is lower than a predetermined reference brightness.

10. The camera as defined in claim 9, wherein said electronic flash exposure adjusting device adjusts the exposure by said electronic flash in such a manner that the smaller the latitude of said photo film is, the smaller the exposure by said electronic flash is.

11. The camera as defined in claim 5, wherein said shutter also works as aperture blades and said automatic exposure adjusting device controls the opening and closing operation of said shutter according to the brightness determined by said photometry part.

12. The camera as defined in claim 5, wherein said electronic flash exposure adjusting device gradually controls the exposure by said electronic flash.

13. The electronic flash light-emission control apparatus, as defined in claim 4 wherein
   said electronic flash exposure adjusting device adjusts an exposure by controlling timing of said flash.

* * * * *